(12) United States Patent
Lee et al.

(10) Patent No.: US 8,027,515 B2
(45) Date of Patent: Sep. 27, 2011

(54) SYSTEM AND METHOD FOR REAL-TIME CALCULATING LOCATION

(75) Inventors: Jae Yeong Lee, Daejon (KR); Heesung Chae, Daejon (KR); Won Pil Yu, Ulsan (KR); Young Jo Cho, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 740 days.

(21) Appl. No.: 12/089,563

(22) PCT Filed: Dec. 14, 2005

(86) PCT No.: PCT/KR2005/004304
§ 371 (c)(1),
(2), (4) Date: Apr. 8, 2008

(87) PCT Pub. No.: WO2007/052859
PCT Pub. Date: May 10, 2007

(65) Prior Publication Data
US 2008/0310682 A1    Dec. 18, 2008

(30) Foreign Application Priority Data
Oct. 31, 2005   (KR) .................. 10-2005-0103285

(51) Int. Cl.
*G06K 9/00* (2006.01)
(52) U.S. Cl. ........ 382/103; 382/106; 382/151; 382/153; 382/291; 382/293; 348/119; 348/136; 348/140; 348/143
(58) Field of Classification Search .................. 382/103, 382/106, 151, 153, 291, 293; 348/119, 136, 348/140, 143
See application file for complete search history.

(56) References Cited

U.S. PATENT DOCUMENTS

| | | | |
|---|---|---|---|
| 4,797,557 A | 1/1989 | Öhman | |
| 6,668,082 B1 * | 12/2003 | Davison et al. | 382/190 |
| 6,993,206 B2 * | 1/2006 | Ishino et al. | 382/291 |
| 7,006,674 B1 * | 2/2006 | Zahniser et al. | 382/128 |
| 7,089,110 B2 * | 8/2006 | Pechatnikov et al. | 701/210 |
| 7,277,599 B2 * | 10/2007 | Eian et al. | 382/285 |
| 2004/0016077 A1 | 1/2004 | Song et al. | |

FOREIGN PATENT DOCUMENTS
EP    1 517 210    3/2005

OTHER PUBLICATIONS

International Search Report mailed Jul. 31, 2006; PCT/KR2005/004304.

* cited by examiner

*Primary Examiner* — Manav Seth
(74) *Attorney, Agent, or Firm* — Ladas & Parry LLP

(57) ABSTRACT

Provided is a system and method for providing location information of robot in real time using an artificial mark. The system includes: an image processing module for obtaining an image signal by photographing artificial marks installed at a predetermined space with a space coordinate and detecting an image coordinate of artificial mark from the obtaining the image signal; a location calculating module for calculating a current location by comparing the image coordinate of detected artificial mark and a pre-stored space coordinate of artificial mark; and an artificial mark identifying module for updating current location information by selectively using one of an artificial mark tracing process and an image coordinate estimating process.

21 Claims, 3 Drawing Sheets

[Fig. 1]
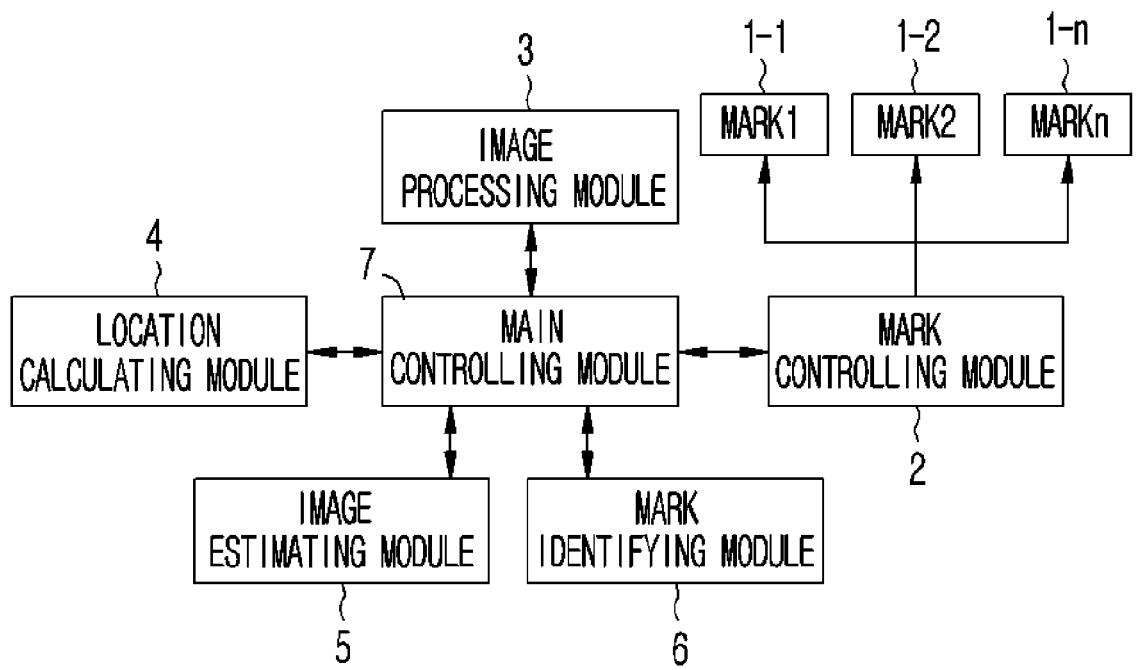
[Fig. 2]
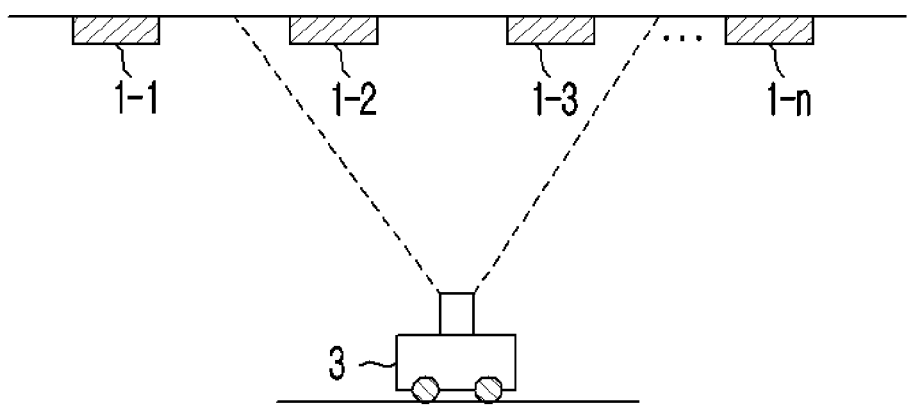

[Fig. 3]
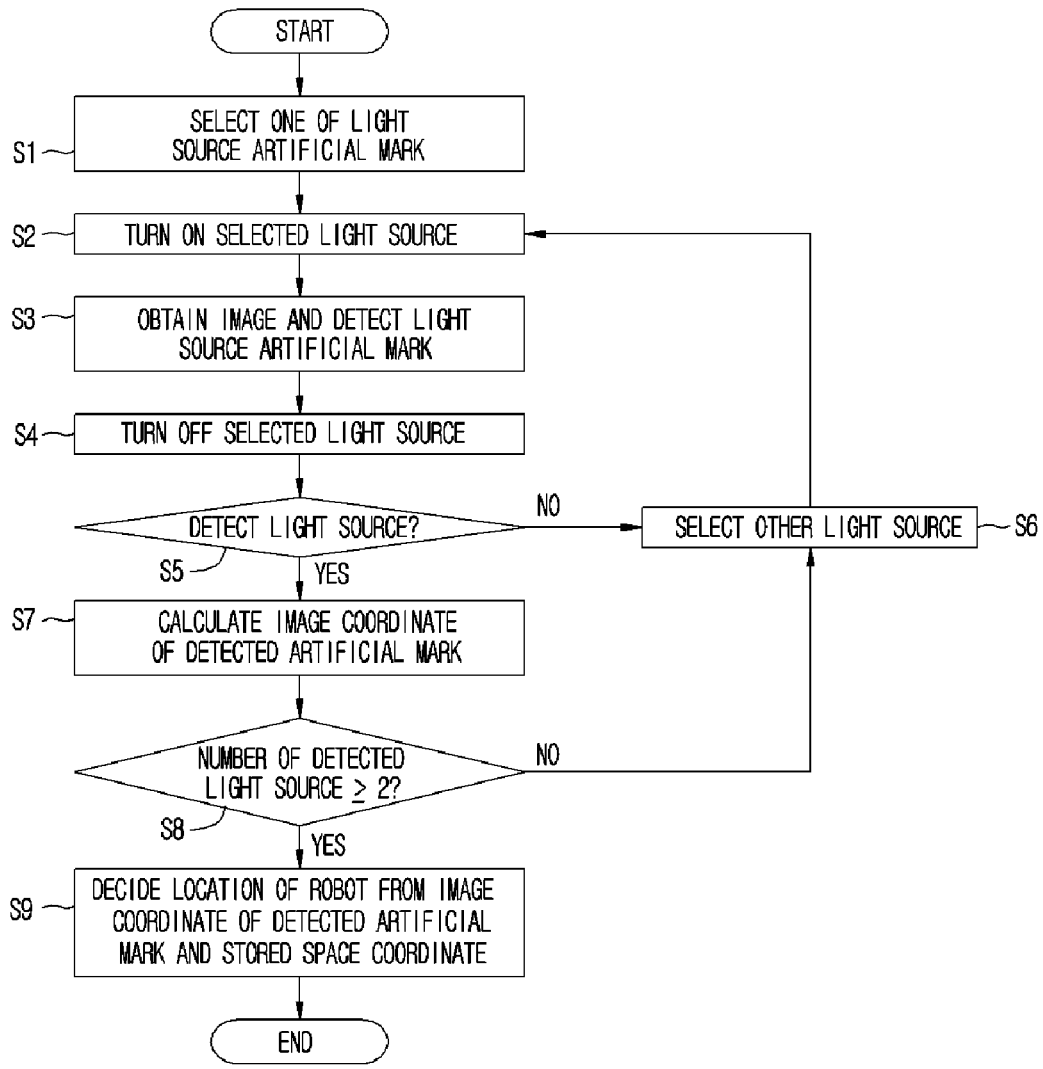
[Fig. 4]
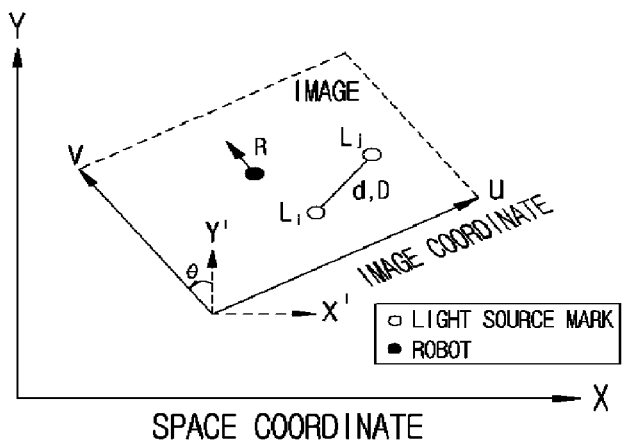

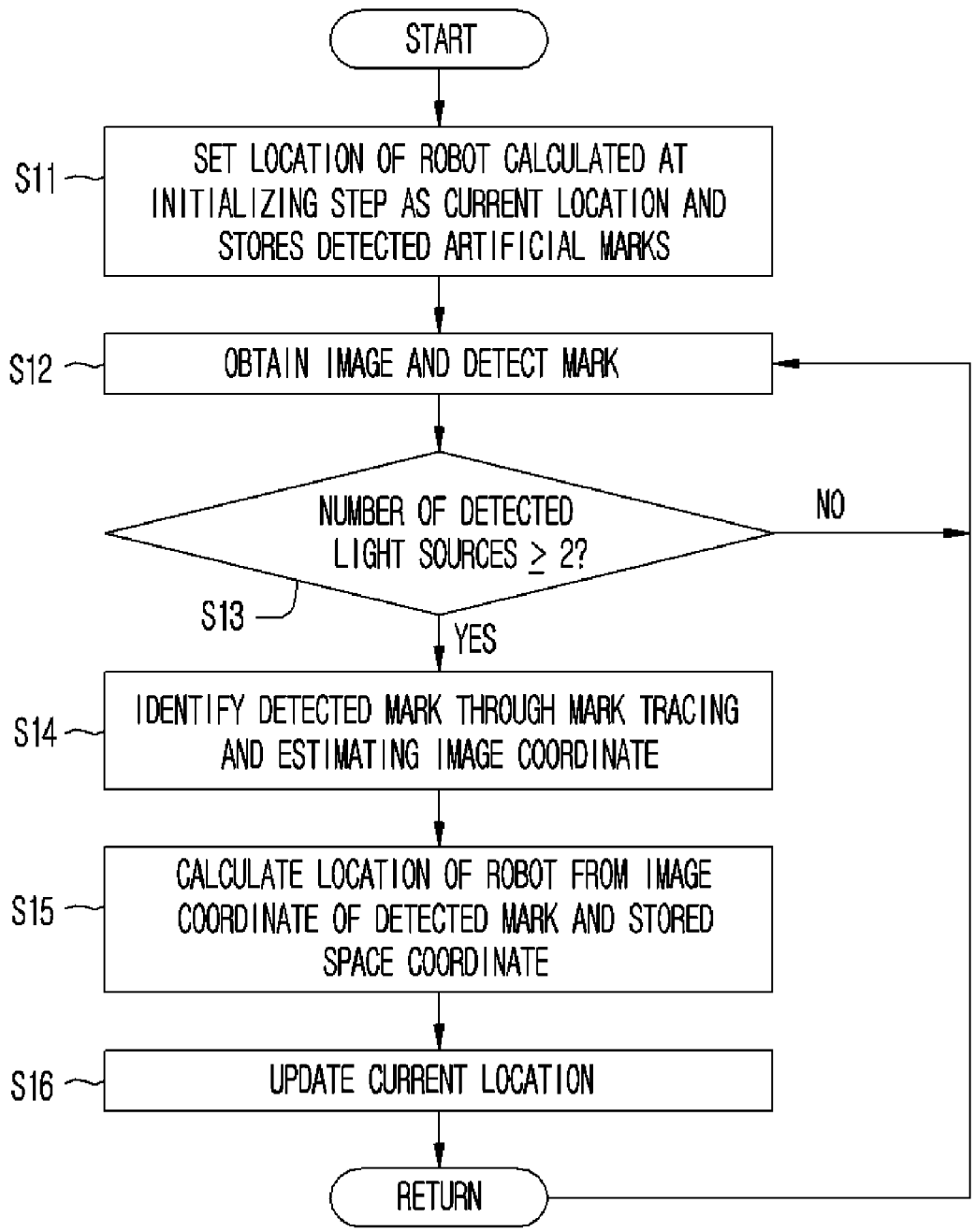

SYSTEM AND METHOD FOR REAL-TIME CALCULATING LOCATION

TECHNICAL FIELD

The present invention relates to a system and method for calculating a location of robot in real-time, and more particularly, to a system and method for providing location information of robot in real time using an artificial mark.

BACKGROUND ART

A robot must recognize a current location of itself in order to automatically travel to a destination after defining a path to that destination.

An artificial marking scheme is generally used as a way of determining a location of robot. In the artificial marking scheme, artificial marks are used which are designed to be distinguished from a background. Such artificial marks are installed throughout an indoor place, and a robot finds the artificial marks to recognize the location of robot by obtaining images of artificial marks through photographing the artificial marks using a camera and processing the obtained images. The location of robot is calculated by referring the image coordinate of detected artificial mark and the indoor space coordinate of the artificial mark that is pre-stored in the robot. There were various methods of calculating the location of robot introduced.

The artificial marks are generally geometrical patterns such as a circle or a rectangle. In order to accurately recognize the current location of robot, the robot has to process images to recognize such a geometrical pattern. Since the image signal captured from the indoor space through the camera is seriously influenced by a direction of a light and a distance from the light to the camera, it is very difficult to stably recognize the artificial marks in the indoor space. Therefore, complicated calculating steps are required to improve the performance of recognizing the artificial marks in a general environment. However, the complicated calculating steps also increase the time of processing the image to recognize the location of robot. Therefore, it is impossible to calculate the location of robot in real time. Especially, it is almost impossible to recognize the location of robot at night since a camera barely captures images when there is not much light provided.

In order to overcome such a drawback, there was another conventional artificial marking scheme introduced, which uses a light source as the artificial marks that can be turned on and off. Such a conventional artificial marking scheme uses the light sources that emit a predetermined wavelength of light as the artificial marks. In order to capture the light sources, a camera having a filter passing the predetermined wavelength of light is used. Accordingly, an image processing is simplified and the reliability for recognizing the artificial marks is improved. Such a conventional artificial marking scheme is barely influenced by the light, and it can be used at the night to move the robot.

However, the light source artificial marks have no differences in their forms, generally. Therefore, it is difficult to distinguish one from another. That is, the artificial marks are turned on and off in sequence to recognize each of the artificial marks. Such a recognition procedure requires a time in proportion to the number of light sources. Also, the robot must be stopped before performing the light source recognition procedure. Therefore, the location of robot cannot be calculated in real time, and it cannot be used while the robot is moving.

A robot must be capable of changing a traveling path to a destination in order to implement the robot in an indoor space. It is because there are many dynamic obstacles existed such as human. In order to avoid collusion with these obstacles while the robot travels to the destination, the robot must frequently change its path to the destination. In order to establish the new path, the robot must recognize the current location of itself. If the robot must be stopped and the light source artificial marks are turned on and off in sequence for calculating the current location, it is very ineffective to manage and to drive the robot.

DISCLOSURE OF INVENTION

Technical Problem

It is, therefore, an object of the present invention to provide a system and method of calculating a location of robot in real time based on an artificial mark without regarding to a driving state of robot in an indoor place having a predetermined size and structure through using light sources as artificial marks, identifying artificial marks detected from an image by selectively using one of an artificial mark tracking process and an image coordinate estimating process without turning on and off the artificial marks in sequence.

Technical Solution

In accordance with one aspect of the present invention, there is provided a system of calculating a location based on an artificial mark in real time, the system including: an image processing module for obtaining an image signal by photographing artificial marks installed at a predetermined space with a space coordinate and detecting an image coordinate of artificial mark from the obtaining the image signal; a location calculating module for calculating a current location by comparing the image coordinate of detected artificial mark and a pre-stored space coordinate of artificial mark; and an artificial mark identifying module for updating current location information by selectively using one of an artificial mark tracing process and an image coordinate estimating process, where the artificial mark tracing process identifies an artificial mark detected at a current time as one of artificial marks detected at a previous time which is closest to the currently detected artificial mark, and the image coordinate estimating process identifies an artificial mark by estimating an image coordinate of artificial mark using current location information and a pre-stored space coordinate of artificial mark and comparing the estimated image coordinate and the detected image coordinate.

The artificial marks may be installed at a ceiling of building and a controller may be included in a robot where the controller includes the mark control module, the image process module, the location calculate module, the image estimate module, the mark identifying module and the main control module. Also, the image process module having a camera may be only included in a robot and the controller having other devices is included in a remote sever. It is preferable that the image process module communicates with the remote server through a wired or a wireless communication link.

In accordance with another aspect of the present invention, there is provided a method of calculating a location in real time based on an artificial mark, including the steps of: a) calculating an current initial location using an image coordinate recognized through turning on and off an artificial mark or assigning the current initial location as a predetermined location; b) identifying detected artificial marks through an artificial mark tracing process while traveling at a mark identifying module, where the artificial mark tracing process identifies an artificial mark detected at a current time as one of artificial marks detected at a previous time which is closest to the currently detected artificial mark; and c) updating a current location at a location calculating module based on the image coordinate of the detected and identified artificial mark and a pre-stored space coordinate in a main control module.

The step a) may include the steps of: a-1) turning on/off a predetermined artificial mark at a mark control module; a-2) photographing images of the predetermined artificial mark which is turned on/off using a camera included in an image processing module; a-3) detecting a predetermined artificial mark through processing an image signal obtained through photographing the images; a-4) calculating an image coordinate of the detected artificial mark; a-5) determining whether the number of detected artificial marks is larger than a predetermined number; and a-6) calculating an image coordinate through turning on/off other artificial marks until the number of detected artificial marks is larger than the predetermined number when the number of detected artificial mark is smaller than the predetermined number, or deciding an initial current location from an image coordinate of detected artificial mark and the pre-stored space coordinate at a main control module when the number of detected artificial marks is larger than the predetermined number.

The step b) may include the steps of: b-1) detecting an artificial mark through an image processing; b-2) determining whether the number of detected artificial marks is larger than a predetermined number; b-3) performing an artificial mark detection when the number of detected artificial marks is smaller than the predetermined number, or estimating an image coordinate of artificial marks through location information at a time t−1 when the number of detected artificial marks is larger than the predetermined number; and b-4) identifying an artificial mark having the estimated image coordinate closest to the image coordinate of detected artificial mark.

The step b) may include the steps of: b-1) performing an artificial mark tracing; b-2) detecting a new artificial mark through an image process when the traced artificial mark is disappeared; b-3) determining whether the number of detected artificial marks including the new artificial marks is larger than a predetermined number or not; b-4) performing an artificial mark detection when the number of detected artificial marks is smaller than the predetermined number or estimating an image coordinate through location information at a previous time t−1 for new artificial mark when the number of detected artificial marks is larger than the predetermined number; and b-5) identifying an artificial mark having the estimated image coordinate closest to the image coordinate of the new detected artificial mark as an newly detected artificial mark.

Advantageous Effects

The system and method of calculating a location of robot in real time based on an artificial mark according to the present invention has following advantages.

The system and method of calculating a location of robot in real time according to the present invention can provide location information of robot in real time without regarding to a driving state of robot after detecting the initial location of robot. It is because that the system and method according to the present invention does not require the robot to be stopped to calculate the current location and can provide location information as fast as the speed of image obtaining in a camera.

The system and method of calculating a location of robot in real time according to the present invention provides an accurate location of robot by accurately measuring the space coordinate of artificial marks and storing them. The present invention also can be implemented as a stable location calculating system because the present invention always calculates same location information at an identical location.

The system and method of calculating a location of robot in real time based on an artificial mark according to the present invention can be implemented as a location calculating system providing location information in real time in a wider operating area if at least two artificial marks are installed in a unit region of indoor place so as to be captured by the camera at the same time without regarding to the structure of indoor space.

The system and method of calculating a location of robot in real time based on an artificial mark according to the present invention dose not require information about the height of ceiling to calculate the location of robot. Therefore, the system and method according to the present invention can be used in various shapes of indoor places.

The system and method of calculating a location of robot in real time based on an artificial mark according to the present invention allows the smooth motion controlling and improve the operating speed because it does not require the robot to be stopped or the additional time to detect the current location of robot.

The system and method of calculating a location of robot in real time based on an artificial mark according to the present invention allows the robot to easily detect its location and allows the robot to freely redefine the path to the destination.

Since the system and method of calculating a location of robot in real time based on an artificial mark according to the present invention allows the robot to calculate the location information in real time while traveling, the robot can change the path to the destination when the robot meets the obstacles. Or the robot can change the path if the destination is changed while traveling.

The system and method of calculating a location of robot in real time based on an artificial mark according to the present invention stably calculates the location information of robot although geometric artificial marks or natural marks are used because the detection of artificial marks is verified by comparing the image coordinate of detected artificial mark and the estimated image coordinate.

The system and method of calculating a location of robot in real time based on an artificial mark according to the present invention can be implemented not only into the robot but also into a manual-controllable mobile device to measure a location of indoor place.

Since the absolute coordinate is provided in real time according to the present invention, an environment map can be composed accurately by reflecting measured data into the absolute location information using an ultra sound wave, an infrared ray or a vision sensor.

BRIEF DESCRIPTION OF THE DRAWINGS

FIG. 1 is a block diagram showing a system of calculating a location of robot in real time based on an artificial mark according to an embodiment of the present invention.

FIG. 2 is a conceptual view of managing the system of calculating a location of robot in real time according to the present invention.

FIG. 3 is a flowchart showing a method of detecting artificial marks and recognizing an initial location.

FIG. 4 shows a relation between the space coordinate and the error compensated image coordinate.

FIG. 5 is a flowchart showing a method of calculating a location of robot after initializing according to an embodiment of the present invention.

BEST MODE FOR CARRYING OUT THE INVENTION

Other objects and aspects of the invention will become apparent from the following description of the embodiments with reference to the accompanying drawings, which is set forth hereinafter.

FIG. 1 is a block diagram showing a system of calculating a location of robot in real time based on an artificial mark according to an embodiment of the present invention.

Referring to FIG. 1, the system of calculating a location of robot in real time includes: a plurality of artificial marks installed at various locations in the indoor place; a mark control module for controlling the artificial marks to be turned on and off; an image processing module for obtaining an image signal through photographing the artificial marks using a camera and detecting an image coordinate of artificial mark from the obtained image signal; a location calculating module for calculating the location of robot by referring the image coordinate of detected artificial mark and a pre-stored space coordinate of artificial mark; an image estimating module for estimating the image coordinate of artificial mark by referring to the calculated location information of robot and the pre-stored space coordinate of artificial mark; a mark identifying module for identifying the artificial mark by comparing the estimated image coordinate and the detected image coordinate; and a main controlling module for updating location information of robot in real time through controlling operations of modules.

FIG. 2 is a conceptual view of managing the system of calculating a location of robot in real time according to the present invention.

Referring to FIG. 2, each of the artificial marks includes a light emitting unit such as a light emitting diode (LED) that emits a predetermined wavelength of light. Such artificial marks are controlled to be turned on and off according to a signal generated from the mark control module. Also, each of the artificial marks has a unique ID to be distinguished from other artificial marks. Those artificial marks, for example, are installed at a ceiling. The locations of artificial marks installed on the ceiling are stored in the robot through the real measurement, and those locations are defined as the space coordinates of the artificial marks. In order to store the space coordinates of artificial marks, a storing module is included additionally in the system shown in FIG. 1. The image processing module includes a camera having an optical filter that filters the light to pass only a predetermined wavelength of light emitted from a light emitting unit included in the artificial marks. The camera is also installed at the robot to face the ceiling vertically from the floor. The location of installing the camera may be modified according to the location of installed artificial marks.

In the present embodiment, the location of robot is calculated through recognizing an initial location of robot by detecting the artificial marks and updating the location information of robot, periodically. The initial location of robot is a location where the robot is initialized to be driven in an indoor place. That is, the robot must recognize the initial location of itself without having no related information of location in the indoor place. In the present embodiment, the initial location of robot is recognized through detecting the artificial marks. After recognizing the initial location, the location information of robot is calculated in real time through an artificial mark tracing process and an image coordinate estimating process. Hereinafter, the method of calculating the location of robot will be described in detail.

(1) Initial Location Recognition

The major feature of present invention is a method of updating location information of robot in real time through the artificial mark tracing process and the image coordinate estimating process. In order to provide the major feature, it requires the robot to detect the artificial marks and to detect the initial location of itself. The artificial marks are turned on and off in sequence to detect the initial location of robot.

FIG. 3 is a flowchart showing a method of detecting artificial marks and recognizing an initial location.

Referring to FIG. 3, a mark control module selects one of artificial marks installed in the indoor place when all of the artificial marks are turned off at step S1. The mark control module generates a control signal, i.e., a turn-on signal, to turn on the selected artificial mark at step S2. Herein, the control signal may be transmitted through a wired link or a wireless link.

The artificial marks are detected through image processing performed on image signals obtained through a camera that photographs the artificial marks at step S3. Then, the selected artificial mark is turned off at step S4. Meanwhile, it determines whether the artificial mark is detected from the image at step S5. If the artificial mark, that is, the light source, is not detected, a next artificial mark is selected at step S6. Such steps S2 through S5 are performed, repeatedly. If the artificial mark is detected from the image, the artificial mark is identified as one controlled by the mark control module. That is, the artificial mark detected from the image is identified by the unique ID assigned to the artificial mark that is selected by the mark control module to be turned on and off. Accordingly, the image coordinate of detected artificial mark is calculated at step S7.

Then, it determines whether the number of detected artificial marks that are the light sources is larger than a predetermined number or not at step S8. If the number of detected artificial marks is larger than the predetermined number, a location of robot is determined based on the image coordinate of detected artificial mark and the stored space coordinate at step S9. Meanwhile, if the number of detected light source is smaller than the predetermined number, the step of detecting the artificial mark is performed through selecting a next artificial mark, transmitting a control signal to the next selected artificial mark and turning on the next selected artificial mark. Such steps are repeatedly performed until the artificial marks are detected as many as the number of artificial marks required to calculate a location of robot. In the present embodiment, the steps are performed twice because two light sources are required to be detected to calculate the location of robot. However, the present invention is not limited by the number of the light sources that is required to calculate the location of robot.

The image processing for detecting the artificial marks is simply achieved by detecting a region having brightness higher than a predetermined threshold value through performing a quantization process on the image signal because the camera includes the optical filter that filters the predetermined wavelength of light. When the artificial mark is detected, the image coordinate of detected artificial mark is determined as a coordinate of center of detected region.

After detecting the artificial marks as many as the number of artificial marks required for calculating the location of robot, the location of robot is calculated by referring the image coordinates of detected artificial marks and the pre-stored space coordinate of corresponding artificial marks.

The location of robot can be calculated by using two artificial marks but three artificial marks may be used to calculate the location of robot to minimize the error. As an example, it assumes that two artificial marks are $L_i$ and $L_j$, the image coordinates thereof are $(x_i, y_i)$, $(x_j, y_j)$ and the stored space coordinates are $(X_i, Y_i)$, $(X_j, Y_j)$. The location of robot may be calculated as follows. In the present embodiment, required location information is a coordinate of a 2-D plane although the operating space of robot is 3-D space. Also, the height information is not required to calculate the location of robot. Therefore, the 2-D coordinate is used.

At first, an error corrected image coordinate $(u_i, v_i)$, $(u_j, v_j)$ is calculated from the image coordinate of detected artificial marks $(x_i, y_i)$, $(x_j, y_j)$ through correcting errors generated from a camera lens using following equations. In the following equations Eqs. 1 through 3, subscripts i and j are not assigned to identify two light source artificial marks. (x, y) denotes the detected image coordinate and (u, v) denotes the lens error compensated coordinate.

$$\begin{bmatrix} x_d \\ y_d \\ 1 \end{bmatrix} = \begin{bmatrix} f_x & 0 & c_x \\ 0 & f_y & c_y \\ 0 & 0 & 1 \end{bmatrix}^{-1} \begin{bmatrix} x \\ y \\ 1 \end{bmatrix} \Rightarrow \begin{cases} x_d = [x - c_x]/f_x \\ y_d = [y - c_y]/f_y \end{cases} \quad \text{Eq. 1}$$

$$\begin{bmatrix} x_u \\ y_u \end{bmatrix} = \frac{1}{1 + k_1 r^2 + k_2 r^4 + k_3 r^6} \begin{bmatrix} x_d \\ y_d \end{bmatrix}, \; r^2 = x_u^2 + y_u^2 \quad \text{Eq. 2}$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x_u \\ y_u \\ 1 \end{bmatrix} \quad \text{Eq. 3}$$

In Eqs. 1 through 3, $f_x$ and $f_y$ denote a focus distance and $C_x$ and $C_y$ denote internal parameters of camera representing an image coordinate at a center of lens. $k_1$, $k_2$ and $k_3$ denote constants representing the lens error coefficients obtained through calibration.

Then, the location of robot $(r_x, r_y, \theta)$ is calculated based on the error corrected image coordinate $(u_i, v_i)$, $(u_j, v_j)$ and the stored space coordinates $(X_i, Y_i)$, $(X_j, Y_j)$. Herein, $\theta$ denotes a heading angle based on the Y axis of space coordinate as a reference. FIG. 4 shows a relation between the space coordinate and the error compensated image coordinate.

Referring to FIG. 4, the location of robot becomes a center of an image since the camera is installed at the robot to face the ceiling, vertically. That is, the image coordinate of robot becomes $(C_x, C_y)$. The space coordinate $(r_x, r_y)$ of robot is calculated by transforming the image coordinate $(L_i, L_j)$ of detected light source artificial marks and applying the transformed image coordinate on $(C_x, C_y)$. Since the camera faces the ceiling vertically, the transforming of coordinate can be performed through a 2-D rotation transform and a 2-D parallel transform as follows.

$$s = \frac{D}{d} = \frac{\sqrt{(X_i - X_j)^2 + (Y_i - Y_j)^2}}{\sqrt{(u_i - u_j)^2 + (v_i - v_j)^2}} \quad \text{Eq. 4}$$

$$\cos\theta = \frac{(u_j - u_i)(X_j - X_i) + (v_j - v_i)(Y_j - Y_i)}{dD} \quad \text{Eq. 5}$$

$$\sin\theta = \frac{(u_j - u_i)(Y_j - Y_i) - (v_j - v_i)(X_j - X_i)}{dD} \quad \text{Eq. 6}$$

$$\begin{bmatrix} r_x \\ r_y \end{bmatrix} = s \begin{bmatrix} \cos\theta & -\sin\theta \\ \sin\theta & \cos\theta \end{bmatrix} \left( \begin{bmatrix} c_x \\ c_y \end{bmatrix} - \begin{bmatrix} u_i \\ u_j \end{bmatrix} \right) + \begin{bmatrix} X_i \\ Y_j \end{bmatrix} \quad \text{Eq. 7}$$

As described above, the initial location of robot $(r_x, r_y, \theta)$ is calculated according to the present embodiment. The detecting of artificial marks and the recognizing of initial location are time consuming processes because the robot must be stopped before turning on and off the artificial marks, the images of artificial marks are obtained while the artificial marks are controlled to be turned on and off in sequence and the artificial marks are detected from the those obtained images. However, such he detecting of artificial marks and the recognizing of initial location are performed once when the robot is initialized. After then, the location information of robot is calculated in real time through the artificial mark tracing process and the image coordinate estimating process without turning on and off the artificial marks.

Meanwhile, there is other method of detecting the initial location of robot. A start location of driving the robot is generally a fixed location. It is because the robot needs to be electrically charged periodically. Therefore, the start location of robot is set as the initial location of robot. For example, a power charge system is required to charge the robot periodically because it is impossible to generate electric power in the robot itself. Therefore, the location where the robot is electrically charged may be set as the initial location of robot.

(2) Updating a Location of Robot in Real Time

In a step of updating a location of robot in real time, images are obtained using a camera at a predetermined time interval, the artificial marks are detected from the obtained images and the location information of robot is updated including the space coordinate and the traveling direction of robot. The speed of obtaining image is decided according to the camera. For example, the location of robot may be updated in a speed of 30 Hz per second when the robot uses a camera capable of obtaining 30 frames of images in a second.

Hereinafter, a method of calculating a location of robot in real time while the robot is traveling will be described.

At first, it assumes that the location of robot is calculated through obtaining images at a time t, detecting artificial marks from the obtained image and identifying the detected artificial marks. Then, images of a time t+1 are obtained, and artificial marks are detected from the image of time t+1. There must be a difference between an image coordinate of detected artificial marks at time t and another image coordinate of detected artificial marks at the time t+1 due to the movement of robot. However, the difference of image coordinates is very little because the moving speed of robot is slower than the speed of camera to obtain images. If the camera obtains 30 frames of images per a second and the robot travels 3 cm per second, the robot physically moves 10 cm while the camera obtains one frame of image. Accordingly, there are differences generated within several pixels between images with regarding to the height of ceiling. Therefore, the detected artificial marks at time t+1 can be identified as the artificial marks detected at time t which are closest to the detected artificial marks at time t+1. Such a processing is called the artificial mark tracing process. After the artificial marks are identified, the location of robot is calculated based on the same method described in the initial location calculating process.

When the artificial marks are installed at the indoor place, at least two of them are installed at a predetermined unit region of indoor space so that the camera can capture at least two of artificial marks at the same time. It is possible to calculate the location of robot in real time by only performing the artificial mark tracing process in a small area of indoor space where the location of robot can be calculated with only two artificial marks. However, a plurality of artificial marks must be installed to calculate the location of robot in a wider indoor place having a random structure and size. In the wider indoor place, traced artificial marks are disappeared from the image and new artificial marks are detected from the image while the robot is moving since an area captured by the angle of camera is limited. In this case, the new artificial marks cannot be identified by only performing the artificial mark tracing process. In order to identify the new artificial marks, an image coordinate is reversely estimated from the pre-stored space coordinate of artificial marks using the location information of robot calculated at a time t. Since the estimated image coordinate is calculated using the location of robot at time t, there is a difference generated between the estimated image coordinate and the real image coordinate at a time t+1. Therefore, the newly detected artificial marks can be identified using the proximity of image coordinate similar to the artificial image tracing process.

Hereinafter, the method of calculating a location of robot in real time will be described in detail.

FIG. 5 is a flowchart showing a method of calculating a location of robot after initializing according to an embodiment of the present invention.

Referring to FIG. 5, an image is obtained using a camera at first. It assumes that a time of obtaining the current image is t, a time of obtaining a previous image is t−1, artificial marks detected from the previous images at time t−1 are $L_i$ and $L_j$, image coordinates thereof are $(x_i^{t-1}, y_i^{t-1})$, $(x_j^{t-1}, y_j^{t-1})$, error corrected image coordinates are $(u_i^{t-1}, v_i^{t-1})$, $(u_j^{t-1}, v_j^{t-1})$, pre-stored space coordinates are $(X_i, Y_i)$, $(X_j, Y_j)$ and a calculated location of robot is $(r_x^{t-1}, r_y^{t-1}, \theta^{t-1})$. At the time t−1, the detected artificial marks and the location of robot are set with the values obtained when the initial location of robot is recognized at step S11.

Then, the artificial marks are detected from the current obtained image through the image processing. Herein, the artificial marks are detected from predetermined rectangular areas adjacent to the image coordinate of artificial marks detected at the time t−1 without detecting the artificial marks from the entire images. The size of rectangular area is decided based on a distance maximally traveled by the artificial mark within an image at one image obtaining interval of camera with regarding to the height of ceiling and the traveling speed of robot. If the artificial mark is detected from one rectangular area having a center of $(x_i^{t-1}, y_i^{t-1})$, the detected artificial mark is identified as $L_i$. If the artificial mark is detected from one rectangular area having a center of $(x_j^{t-1}, y_j^{t-1})$, the detected artificial mark is identified as $L_j$. If artificial marks are detected from both of two rectangular areas, the location of robot can be calculated from the pre-stored space coordinate using the identical method shown in the initial recognition because the artificial marks are already identified.

If the artificial marks are not detected from the two rectangular areas, the artificial marks are detected from other image areas at outside of the rectangular area at step S12. The artificial marks are not detected from the two rectangular areas when the artificial marks detected at the time t−1 are disappeared from the angle of camera. In this case, the new artificial marks are detected from an image. Since at least two artificial marks are installed in the predetermined unit region so that the camera captures at least two artificial marks at the same time, the artificial marks are detected from the new image as many as the number of artificial marks disappeared from the angle of camera. Accordingly, it determines whether the number of newly detected light sources is larger than a predetermined number such as two at step S13. In the present embodiment, the number of minimum artificial marks is set as two. However, the present invention is not limited by the number of artificial marks.

It assumes that the image coordinate of newly detected artificial marks is x, y and the error corrected coordinate u, v. The newly detected artificial marks are identified through estimating the image coordinate from the space coordinate $(X_k, Y_k)$ of each artificial mark $L_k$ using the location of robot $(r_x^{t-1}, r_y^{t-1}, \theta^{t-1})$ at time t−1 at step 14. Herein, K=1 and n denotes the total number of artificial marks installed. If the lens error is not occurred, the estimated image coordinate $(\hat{u}_k, \hat{v}_k)$ of $L_k$ is calculated flowing equations where s denotes the scale transforming used in the initial recognition.

The newly detected artificial marks are identified as the artificial mark having the estimated image coordinate $(\hat{u}_k, \hat{v}_k)$ which is closest to (u, v).

$$\begin{bmatrix} \hat{u}_k \\ \hat{v}_k \end{bmatrix} = \begin{bmatrix} c_x \\ c_y \end{bmatrix} - \frac{1}{s}\begin{bmatrix} \cos\theta^{t-1} & \sin\theta^{t-1} \\ -\sin\theta^{t-1} & \cos\theta^{t-1} \end{bmatrix}\left(\begin{bmatrix} r_x^{t-1} \\ r_y^{t-1} \end{bmatrix} - \begin{bmatrix} X_k \\ Y_k \end{bmatrix}\right), \quad \text{Eq. 8}$$
$$k = 1, \ldots, n$$

It assumes that the artificial marks detected and identified at the time t is $L_p$, $L_q$, image coordinates for each detected artificial mark are $(x_p^t, y_p^t)$ and $(x_q^t, y_q^t)$, the error corrected image coordinate are $(u_p^t, v_p^t)$ and $(u_q^t, v_q^t)$, and the stored space coordinate are $(X_p, Y_p)$ and $(X_q, Y_q)$. Under theses assumptions, the new location of robot $(r_x^t, r_y^t, \theta^t)$ is calculated using following equations at step S15.

$$s^t = \frac{D}{d} = \frac{\sqrt{(X_p - X_q)^2 + (Y_p - Y_q)^2}}{\sqrt{(u_p^t - u_q^t)^2 + (v_p^t - v_q^t)^2}} \quad \text{Eq. 9}$$

$$\cos\theta^t = \frac{(u_q^t - u_p^t)(X_q - X_p) + (v_q^t - v_p^t)(Y_q - Y_p)}{dD} \quad \text{Eq. 10}$$

$$\sin\theta^t = \frac{(u_q^t - u_p^t)(Y_q - Y_p) - (v_q^t - v_p^t)(X_q - X_p)}{dD} \quad \text{Eq. 11}$$

$$\begin{bmatrix} r_x^t \\ r_y^t \end{bmatrix} = s^t\begin{bmatrix} \cos\theta^t & -\sin\theta^t \\ \sin\theta^t & \cos\theta^t \end{bmatrix}\left(\begin{bmatrix} c_x \\ c_y \end{bmatrix} - \begin{bmatrix} u_p^t \\ v_p^t \end{bmatrix}\right) + \begin{bmatrix} X_p \\ Y_p \end{bmatrix} \quad \text{Eq. 12}$$

As described above, the main control module accurately calculates the current location information of robot by performing the artificial mark tracing process and the image coordinate estimating process. The main control module also uses the calculated location information of robot for tracing the artificial marks and estimating the image coordinate at next time of updating the robot location while the electric power is supplied to the robot at step S16.

The method of calculating the location of robot according to the present invention minimizes the interval of updating a location of robot by minimizing the time of calculating the location by combining the artificial mark tracing and the image coordinate estimating as described above. In the preset embodiment, the location of robot is calculated using the artificial mark tracing process and the image coordinate estimating process. However, it is possible to detect the location of robot in real time only through the image coordinate estimating. It requires little bit longer processing time compared to using the artificial mark tracing at the same time. In the method of calculating the location of robot only through the image coordinate estimating, the artificial marks are detected from the entire image obtained from the camera and the image coordinate of each artificial mark is estimated using the location of robot at the most recent time such as a time t−1, and the detected artificial marks are identified as the artificial mark having the estimated image coordinate closest to the image coordinate of detected artificial marks. Since the location calculating method only using the image coordinate estimating performs the artificial mark tracing and the image coordinate estimating on the entire image at each updating interval, it requires a little bit longer calculating time compared to the location calculating method of using both of the image coordinate estimating and the artificial mark tracing. However, the method of calculating the location of robot only through the image coordinate estimating can be used to calculate the location of robot in real time.

While the present invention has been described with respect to certain preferred embodiments, it will be apparent to those skilled in the art that various changes and modifications may be made without departing from the scope of the invention as defined in the following claims.

The invention claimed is:

1. A system of calculating a location based on an artificial mark in real time, the system comprising:
   an image processing module for obtaining an image signal by photographing artificial marks installed at a predetermined space with a space coordinate and detecting an image coordinate of artificial mark from the obtaining the image signal,
   a location calculating module for calculating a current location by comparing the image coordinate of detected artificial mark and a pre-stored space coordinate of artificial mark, and
   an artificial mark identifying module for updating current location information by selectively using one of an artificial mark tracing process and an image coordinate estimating process, where the artificial mark tracing process identifies an artificial mark detected at a current time as one of artificial marks detected at a previous time which is closest to the currently detected artificial mark, and the image coordinate estimating process identifies an artificial mark by estimating an image coordinate of artificial mark using current location information and a pre-stored space coordinate of artificial mark and comparing the estimated image coordinate and the detected image coordinate.

2. The system of claim 1, wherein the artificial mark has a unique ID and is a light source that emits a predetermined wavelength of light.

3. The system of claim 2, further comprising a mark control module for controlling the artificial marks to be turned on and off.

4. The system of claim 2, wherein the camera includes an optical filter that filters the light emitted from a light emitting unit of the artificial mark to pass a predetermined wavelength of light.

5. The system of claim 1, further comprising an image estimating module for performing the image coordinate estimating process using the calculated current location information and the pre-stored space coordinate of artificial mark.

6. The system of claim 1, wherein the camera is installed at a robot and the system includes a remote server that receives and processes a signal from the camera through a wired link and a wireless link.

7. A computerized method of calculating a location in real time based on an artificial mark, comprising the steps of:
   a) calculating by a processor a current initial location using an image coordinate recognized through turning on and off an artificial mark or assigning the current initial location as a predetermined location;
   b) identifying detected artificial marks through an artificial mark tracing process while traveling at a mark identifying module, where the artificial mark tracing process identifies an artificial mark detected at a current time as one of artificial marks detected at a previous time which is closest to the currently detected artificial mark; and
   c) updating a current location at a location calculating module based on the image coordinate of the detected and identified artificial mark and a pre-stored space coordinate in a main control module.

8. A computerized method of calculating a location in real time based on an artificial mark, comprising the steps of:
   a) calculating by a processor a current initial location using an image coordinate recognized through turning on and off an artificial mark or assigning the current initial location as a predetermined location;
   b) identifying artificial marks detected while traveling at a mark identifying module by estimating an image coordinate of artificial mark at an image estimating module based on current location information of artificial mark calculated at a location calculating module and a space coordinate of artificial mark stored in the main control module, and comparing the estimated image coordinate and newly detected image coordinate; and
   c) updating a current location at a location calculating module based on the image coordinate of the detected and identified artificial mark and a pre-stored space coordinate in a main control module.

9. A computerized method of calculating a location in real time based on an artificial mark, comprising the steps of:
   a) calculating by a processor a current initial location using an image coordinate recognized through turning on and off an artificial mark or assigning the current initial location as a predetermined location;
   b) identifying artificial marks detected while traveling at a mark identifying module by performing an artificial mark tracing process on an image where the closest one of artificial marks detected a previous time stage is identified as an identical artificial mark or by estimating an image coordinate of artificial mark at an image estimating module based on current location information of artificial mark calculated at a location calculating module and a space coordinate of artificial mark stored in the main control module and comparing the estimated image coordinate and newly detected image coordinate when the artificial marks detected at the previous state are disappeared; and
   c) updating a current location at a location calculating module based on the image coordinate of the detected and identified artificial mark and a pre-stored space coordinate in a main control module.

10. The method of claim 7, wherein in the step a), the current location is calculated by calculating an initial current location at a location calculating module using an image coordinate detected at an image processing module through turning on and off a predetermined artificial mark at a mark control module and a space coordinate pre-stored in a main control module.

11. The method of claim 10, wherein the step a) includes the steps of:
   a-1) turning on/off a predetermined artificial mark at a mark control module;

a-2) photographing images of the predetermined artificial mark which is turned on/off using a camera included in an image processing module;

a-3) detecting a predetermined artificial mark through processing an image signal obtained through photographing the images;

a-4) calculating an image coordinate of the detected artificial mark;

a-5) determining whether the number of detected artificial marks is larger than a predetermined number; and a-6) calculating an image coordinate through turning on/off other artificial marks until the number of detected artificial marks is larger than the predetermined number when the number of detected artificial mark is smaller than the predetermined number, or deciding an initial current location from an image coordinate of detected artificial mark and the pre-stored space coordinate at a main control module when the number of detected artificial marks is larger than the predetermined number.

12. The method of claim 11, wherein the number of detected artificial marks is two.

13. The method of claim 12, wherein an error corrected image coordinate (u, v) is calculated from the image coordinate (x, y) of detected artificial mark through correcting error due to a camera lens based on following equations, and the calculated error corrected image coordinate (u, v) is used to calculate a current location, wherein the equations are:

$$\begin{bmatrix} x_d \\ y_d \\ 1 \end{bmatrix} = \begin{bmatrix} f_x & 0 & c_x \\ 0 & f_y & c_y \\ 0 & 0 & 1 \end{bmatrix}^{-1} \begin{bmatrix} x \\ y \\ 1 \end{bmatrix} \Rightarrow \begin{cases} x_d = [x - c_x]/f_x \\ y_d = [y - c_y]/f_y \end{cases} \quad \text{Eq. 1}$$

$$\begin{bmatrix} x_u \\ y_u \end{bmatrix} = \frac{1}{1 + k_1 r^2 + k_2 r^4 + k_3 r^6} \begin{bmatrix} x_d \\ y_d \end{bmatrix}, r^2 = x_u^2 + y_u^2 \quad \text{Eq. 2}$$

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} x_u \\ y_u \\ 1 \end{bmatrix} \quad \text{Eq. 3}$$

where $f_x$ and $f_y$ denote a focus distance, $C_x$ and $C_y$ denote internal parameters of camera representing an image coordinate at a center of lens, and $k_1$, $k_2$ and $k_3$ denote constants representing the lens error coefficients obtained through calibration.

14. The method of claim 13, wherein the initial current location $(r_x, r_y, \theta)$ is calculated from the error corrected image coordinate $(u_i, v_i)$ and $(u_j$ and $v_j)$ and the stored space coordinate $(X_i, Y_i)$ and $(X_j, Y_j)$ based on equations:

$$s = \frac{D}{d} = \frac{\sqrt{(X_i - X_j)^2 + (Y_i - Y_j)^2}}{\sqrt{(u_i - u_j)^2 + (v_i - v_j)^2}} \quad \text{Eq. 4}$$

$$\cos\theta = \frac{(u_j - u_i)(X_j - X_i) + (v_j - v_i)}{dD} \quad \text{Eq. 5}$$

$$\sin\theta = \frac{(u_j - u_i)(Y_j - Y_i) - (v_j - v_i)(X_j - X_i)}{dD} \quad \text{Eq. 6}$$

$$\begin{bmatrix} r_x \\ r_y \end{bmatrix} = s \begin{bmatrix} \cos\theta & -\sin\theta \\ \sin\theta & \cos\theta \end{bmatrix} \left( \begin{bmatrix} c_x \\ c_y \end{bmatrix} - \begin{bmatrix} u_i \\ v_i \end{bmatrix} \right) + \begin{bmatrix} X_i \\ Y_i \end{bmatrix} \quad \text{Eq. 7}$$

where $\theta$ denotes a heading angle based on a Y axis of space coordinate.

15. The method of claim 7, wherein the predetermined location in the step a) is a predetermined driving staring location.

16. The method of claim 7, wherein the artificial mark tracing process detects artificial marks from a predetermined rectangular region based on an image coordinate of artificial marks detected at a predetermined time stage.

17. The method of claim 8, wherein the step b) includes the steps of:

b-1) detecting an artificial mark through an image processing, b-2) determining whether the number of detected artificial marks is larger than a predetermined number, b-3) performing an artificial mark detection when the number of detected artificial marks is smaller than the predetermined number, or estimating an image coordinate of artificial marks through location information at a time t−1 when the number of detected artificial marks is larger than the predetermined number; and b-4) identifying an artificial mark having the estimated image coordinate closest to the image coordinate of detected artificial mark.

18. The method of claim 9, wherein the step b) includes the steps of:

b-1) performing an artificial mark tracing, b-2) detecting a new artificial mark through an image process when the traced artificial mark is disappeared, b-3) determining whether the number of detected artificial marks including the new artificial marks is larger than a predetermined number or not;

b-4) performing an artificial mark detection when the number of detected artificial marks is smaller than the predetermined number or estimating an image coordinate through location information at a previous time t−1 for new artificial mark when the number of detected artificial marks is larger than the predetermined number; and b-5) identifying an artificial mark having the estimated image coordinate closest to the image coordinate of the new detected artificial mark as an newly detected artificial mark.

19. The method of claim 17, wherein an error corrected image coordinate is calculated through correcting the error of camera lens from the image coordinate of new detected artificial mark and the error corrected image coordinate is reflected to calculate a current location.

20. The method of claim 19, wherein the new detected artificial mark is identified as an artificial mark having an image coordinate $\hat{u}_k, \hat{v}_k$ closest to an error corrected image coordinate (u, v) using following equation:

$$\begin{bmatrix} \hat{u}_k \\ \hat{v}_k \end{bmatrix} = \begin{bmatrix} c_x \\ c_y \end{bmatrix} - \frac{1}{s} \begin{bmatrix} \cos\theta^{t-1} & \sin\theta^{t-1} \\ -\sin\theta^{t-1} & \cos\theta^{t-1} \end{bmatrix} \left( \begin{bmatrix} r_x^{t-1} \\ r_y^{t-1} \end{bmatrix} - \begin{bmatrix} X_k \\ Y_k \end{bmatrix} \right), \quad \text{Eq. 8}$$

$$k = 1, \ldots, n$$

where $c_x$ and $c_y$ denotes internal parameters of camera representing an image coordinate of center of lens, $\theta$ denotes a heading angle based on a Y axis of space coordinate, X and Y denote the space coordinate and $$s = \frac{D}{d} = \frac{\sqrt{(X_i - X_j)^2 + (Y_i - Y_j)^2}}{\sqrt{(u_i - u_j)^2 + (v_i - v_j)^2}}.$$

21. The method of claim 20, wherein a current location information $(r_x, r_y, \theta)$ is updated from the error corrected coordinate $(u_i, v_i)$ and $(u_j, v_j)$ and a stored space coordinate $(X_i, Y_i)$ and $(X_j, Y_j)$ using following equations:

$$s^t = \frac{D}{d} = \frac{\sqrt{(X_p - X_q)^2 + (Y_p - Y_q)^2}}{\sqrt{(u_p^t - u_q^t)^2 + (v_p^t - v_q^t)^2}} \quad \text{Eq. 9}$$

-continued $$\cos\theta^t = \frac{(u_q^t - u_p^t)(X_q - X_p) + (v_q^t - v_p^t)(Y_q - Y_p)}{dD} \quad \text{Eq. 10}$$

$$\sin\theta^t = \frac{(u_q^t - u_p^t)(Y_q - Y_p) - (v_q^t - v_p^t)(X_q - X_p)}{dD} \quad \text{Eq. 11}$$

$$\begin{bmatrix} r_x^t \\ r_y^t \end{bmatrix} = s^t \begin{bmatrix} \cos\theta^t & -\sin\theta^t \\ \sin\theta^t & \cos\theta^t \end{bmatrix} \left( \begin{bmatrix} c_x \\ c_y \end{bmatrix} - \begin{bmatrix} u_p^t \\ v_p^t \end{bmatrix} \right) + \begin{bmatrix} X_p \\ Y_p \end{bmatrix}. \quad \text{Eq. 12}$$

* * * * *